(12) United States Patent
Yang et al.

(10) Patent No.: US 10,813,017 B2
(45) Date of Patent: Oct. 20, 2020

(54) COMMUNICATION STATE TRANSITION METHODS AND APPARATUSES

(71) Applicant: HuiZhou TCL Mobile Communication Co., Ltd., HuiZhou (CN)

(72) Inventors: Lu Yang, HuiZhou (CN); Xiang Chen, HuiZhou (CN); Eddy Chiu, HuiZhou (CN)

(73) Assignee: HuiZhou TCL Mobile Communication Co., Ltd., HuiZhou (CN)

(*) Notice: Subject to any disclaimer, the term of this patent is extended or adjusted under 35 U.S.C. 154(b) by 0 days.

(21) Appl. No.: 16/610,918

(22) PCT Filed: Dec. 15, 2017

(86) PCT No.: PCT/CN2017/116338
§ 371 (c)(1),
(2) Date: Nov. 5, 2019

(87) PCT Pub. No.: WO2018/201731
PCT Pub. Date: Nov. 8, 2018

(65) Prior Publication Data
US 2020/0162976 A1    May 21, 2020

(30) Foreign Application Priority Data

May 5, 2017  (CN) .......................... 2017 1 0313953

(51) Int. Cl.
*H04W 36/00* (2009.01)
*H04W 76/27* (2018.01)
(Continued)

(52) U.S. Cl.
CPC .... *H04W 36/0085* (2018.08); *H04W 36/0011* (2013.01); *H04W 36/32* (2013.01);
(Continued)

(58) Field of Classification Search
CPC ..... H04W 64/00; H04W 24/10; H04W 24/02; H04W 48/16; H04W 36/0083;
(Continued)

(56) References Cited

U.S. PATENT DOCUMENTS 7,418,239 B2  8/2008  Brandt et al.
7,477,896 B2  1/2009  Rick et al.
(Continued)

FOREIGN PATENT DOCUMENTS

CN    102340794    2/2012
EP     2490354     8/2012
(Continued)

OTHER PUBLICATIONS

International Search Report and the Written Opinion Dated Feb. 11, 2018 From the International Searching Authority Re. Application No. PCT/CN2017/116338. (6 Pages).

*Primary Examiner* — Mahendra R Patel

(57) ABSTRACT

The present disclosure discloses a communication state transition method. The method comprises: receiving, by a user equipment, information of one or more candidate cells from a current cell; measuring, by the user equipment, the one or more candidate cells when the user equipment is in a RRC_INACTIVE or RRC_IDLE state to obtain measurement results; and building up, by the user equipment, a connection with a desired cell instead of a resident cell to transit from the RRC_INACTIVE or RRC_IDLE state to a RRC_CONNECTED state after receiving a paging message, wherein the desired cell is selected by the user equipment from the one or more candidate cells based on the measurement results. The present disclosure also discloses a communication state transition apparatus.

14 Claims, 7 Drawing Sheets

S11 — UE receiving information of one or more candidate cells from a current cell S12 — UE measuring the one or more candidate cells in the non-connected state to obtain measurement results S13 — UE building up a connection with a desired cell instead of a resident cell to transit from the non-connected state to RRC_CONNECTED state after receiving a paging information

(51) Int. Cl.
    *H04W 76/10* (2018.01)
    *H04W 36/32* (2009.01)
    *H04W 68/00* (2009.01)
(52) U.S. Cl.
    CPC ......... *H04W 68/005* (2013.01); *H04W 76/10* (2018.02); *H04W 76/27* (2018.02)
(58) Field of Classification Search
    CPC .......... H04L 5/0032; H04Q 7/20; H04Q 7/38; Y02D 70/1262; Y02D 70/1264; Y02D 70/146
    USPC ...... 455/436, 449, 428, 67.11; 370/241, 252
    See application file for complete search history.

(56) References Cited

U.S. PATENT DOCUMENTS

| | | | |
|---|---|---|---|
| 8,380,205 B2* | 2/2013 | Hogan | H04W 48/04 455/439 |
| 9,055,503 B2* | 6/2015 | Lee | H04W 36/30 |
| 9,854,591 B2 | 12/2017 | Yiu et al. | |
| 9,918,324 B2* | 3/2018 | Baghel | H04W 72/082 |
| 10,271,252 B2* | 4/2019 | Jung | H04W 36/04 |
| 2003/0153271 A1* | 8/2003 | Brandt | H04W 60/04 455/67.11 |
| 2005/0048982 A1* | 3/2005 | Roland | H04W 48/16 455/449 |
| 2007/0202871 A1* | 8/2007 | Altshuller | H04W 68/06 455/428 |
| 2007/0291770 A1* | 12/2007 | Kitazoe | H04L 61/1541 370/395.52 |
| 2009/0318144 A1* | 12/2009 | Thomas | H04W 48/20 455/434 |
| 2010/0008323 A1* | 1/2010 | Deshpande | H04W 36/00 370/331 |
| 2012/0115532 A1* | 5/2012 | He | H04W 52/242 455/522 |
| 2012/0122458 A1* | 5/2012 | Jokinen | H04W 36/0016 455/437 |
| 2012/0142355 A1* | 6/2012 | Jha | H04W 36/0061 455/436 |
| 2013/0194941 A1* | 8/2013 | Lu | H04W 36/04 370/252 |
| 2014/0113582 A1* | 4/2014 | Aoyagi | H04W 48/12 455/404.1 |
| 2015/0036664 A1* | 2/2015 | Yuk | H04W 24/08 370/332 |
| 2015/0148063 A1* | 5/2015 | Jung | H04W 24/10 455/456.1 |
| 2015/0382320 A1* | 12/2015 | Rune | H04L 47/29 455/426.1 |
| 2016/0174117 A1* | 6/2016 | Wong | H04W 84/045 455/444 |
| 2016/0302115 A1* | 10/2016 | Parkvall | H04W 36/12 |
| 2016/0302118 A1* | 10/2016 | Yiu | H04W 76/27 |

FOREIGN PATENT DOCUMENTS

| | | | | |
|---|---|---|---|---|
| EP | 3024266 A4 * | 7/2016 | | H04W 24/08 |
| EP | 3048834 A4 * | 4/2017 | | H04W 72/085 |
| WO | WO 2005/025263 | 3/2005 | | |
| WO | WO-2013097630 A1 * | 7/2013 | | H04W 36/00835 |
| WO | WO-2015041484 A1 * | 3/2015 | | H04L 5/0032 |
| WO | WO 2016/164095 | 10/2016 | | |
| WO | WO-2017173647 A1 * | 10/2017 | | H04W 36/0069 |
| WO | WO 2018/201731 | 11/2018 | | |

* cited by examiner

COMMUNICATION STATE TRANSITION METHODS AND APPARATUSES

RELATED APPLICATIONS

This application is a National Phase of PCT Patent Application No. PCT/CN2017/116338 having International filing date of Dec. 15, 2017, which claims the benefit of priority of Chinese Patent Application No. 201710313953.7 filed on May 5, 2017. The contents of the above applications are all incorporated by reference as if fully set forth herein in their entirety.

FIELD AND BACKGROUND OF THE INVENTION

Embodiments of the present disclosure generally relate to communication technology, and in particular relate to communication state transition methods and apparatuses.

In New Radio (NR), a user equipment (UE) has three states referred to as RRC_CONNECTED, RRC_INACTIVE and RRC_IDLE, wherein RRC is the abbreviation of Radio Resource Control. The UE in RRC_INACTIVE or RRC_IDLE camping on a certain cell, and can build up a connection with the cell currently camping on to transit to RRC_CONNECTED state after receiving a paging message from this cell. The UE can perform data transmission with a network and perform mobility management such as handover under the control of the network merely in RRC_CONNECTED state.

In NR system, it is possible that the cell on which the UE camps when it is in RRC_INACTIVE or RRC_IDLE is different from the desired cell which the UE expects to be served when the UE is in RRC_CONNECTED. For example, the UE expects to be served by a high frequency cell in RRC_CONNECTED for rapid data transmission and capacity enhancement purpose, while prefers to camp on a low frequency cell when in RRC_INACTIVE or RRC_IDLE in order to avoid frequent cell reselection and more complex operations in a high frequency cell (e.g., the beam tracking process to achieve downlink synchronization and paging monitoring); or the cell on which the UE currently camps cannot provide the required service, and the UE expects to connect to a cell which can provide the required service when transited to RRC_CONNECTED.

For above-mentioned cases, in the related art, the UE needs to perform the mobility management after building up the connection with the cell currently camping on to transit from RRC_INACTIVE or RRC_IDLE to RRC_CONNECTED, so as to perform handover from the currently connected cell (i.e., the cell of UE previously camping on) to the cell which the UE expects to be served. Such mobility management process, which includes UE state transition and handover, will introduce large signaling overhead.

SUMMARY OF THE INVENTION

In view of the above, embodiments of the present disclosure provide communication state transition methods and apparatuses, aiming at addressing the issues of large signaling overhead caused by the cell on which the UE camps when it is in RRC_INACTIVE or RRC_IDLE being different from the cell which the UE expects to be served when it is in RRC_CONNECTED in the related art.

In order to solve the above-mentioned technical problem, a first aspect of the present disclosure provides a communication state transition method. The method includes: receiving, by a user equipment (UE), information of one or more candidate cells from a current cell (the cell which the UE is camping on when it is in RRC_INACITVE or RRC_IDLE); measuring, by the user equipment, the one or more candidate cells when the UE is in a non-connected state (i.e., RRC_INACTIVE or RRC_IDLE) to obtain the measurement results; and building up, by the user equipment, a connection with a desired cell directly instead of a resident cell (where the UE currently camping on) to transit from the non-connected state to RRC_CONNECTED state after receiving a paging message, wherein the desired cell is selected by the user equipment from the one or more candidate cells based on the measurement results.

In order to solve the above-mentioned technical problem, a second aspect of the present disclosure provides a communication state transition method. The method includes: transmitting, by a base station of a current cell, information of one or more candidate cells and a paging message to a user equipment, so that the user equipment builds up a connection with a desired cell instead of a resident cell (where the UE is camping on when it is in RRC_INACTIVE or RRC_IDLE state) to transit from a non-connected state to a RRC_CONNECTED state after receiving the paging message, wherein the desired cell is selected by the user equipment from the one or more candidate cells based on measurement results obtained by measuring the one or more candidate cells when the use equipment is in the non-connected state.

In order to solve the above-mentioned technical problems, a third aspect of the present disclosure provides a communication state transition apparatus. The apparatus includes a processor and a communication circuit coupled to the processor. The processor is configured to execute instructions to implement the method provided by the first or second aspect of the present disclosure.

In order to solve the above-mentioned technical problems, a fourth aspect of the present disclosure provides a communication state transition apparatus storied with instructions. The instructions implement the method provided by the first or second aspect of the present disclosure while executed.

In order to solve the above-mentioned technical problem, a fifth aspect of the present disclosure provides a communication state transition apparatus. The apparatus includes: a receiving module configured to receive information of one or more candidate cells from a current cell; a measurement module configured to measure the one or more candidate cells in a RRC_INACTIVE or RRC_IDLE state to obtain measurement results; and a transition module configured to build up a connection with a desired cell instead of a resident cell to transit from the RRC_INACTIVE or RRC_IDLE state to a RRC_CONNECTED state after receiving a paging message, wherein the desired cell is selected by the user equipment from the one or more candidate cells based on the measurement results.

In order to solve the above-mentioned technical problems, a sixth aspect of the present disclosure provides a communication state transition apparatus. The apparatus includes: a transmission module configured to transmit information of one or more candidate cells and a paging message to a user equipment, so that the user equipment builds up a connection with a desired cell instead of a resident cell to transit from a RRC_INACTIVE or RRC_IDLE state to a RRC-_CONNECTED state after receiving the paging message, wherein the desired cell is selected by the user equipment from the one or more candidate cells based on measurement results obtained by measuring the one or more candidate cells when the use equipment is in the RRC_INACTIVE or RRC_IDLE state.

The present disclosure may have the advantages that the user equipment builds up RRC connection with the desired cell instead of the resident cell after receiving the paging message, and the desired cell is selected by the user equipment in the non-connected state from the one or more candidate cells based on the measurement results obtained by measuring the one or more candidate cells, so that when the resident cell of the user equipment is different from its desired cell, the user equipment can directly build up the connection with its desired cell while transiting to RRC_CONNECTED state from RRC_INACTIVE or RRC_IDLE state, thereby eliminating the unnecessary process of building up a connection with the resident cell and handover to the desired cell, so as to reduce the signaling overhead, including the RRC signaling overhead, as well as the signaling overhead among UE, base station, and core network during handover.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment," do not necessarily refer to the same embodiment. Particular features, structures, or characteristics may be combined in any suitable manner consistent with this disclosure. Various modules, units, circuits, or other components may be described or claimed as "configured to" perform a task or tasks. In such contexts, "configured to" is used to connote structure by indicating that the modules/units/circuits/components include structure (e.g., circuitry) that performs those task or tasks during operation. As such, the modules/units/circuits/components can be said to be configured to perform the task even when the specified module/unit/circuit/component is not currently operational (e.g., is not on). The modules/units/circuits/components used with the "configured to" language include hardware—for example, circuits, memory storing program instructions executable to implement the operation, etc. Reciting that a module/unit/circuit/component is "configured to" perform one or more tasks is expressly intended not to invoke 35 U.S.C. § 112(f), for that module/unit/circuit/component. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. As used herein, the term "based on" describes one or more factors that affect a determination. This term does not foreclose additional factors that may affect the determination. That is, a determination may be solely based on those factors or based, at least in part, on those factors. Consider the phrase "determine A based on B." While in this case, B is a factor affects the determination of A, such a phrase does not foreclose the determination of A from also being based on C. In other instances, A may be determined based solely on B.

DESCRIPTION OF SPECIFIC EMBODIMENTS OF THE INVENTION

The present disclosure will now be described in detail with reference to the accompanying drawings and embodiments. In the following embodiments, the non-conflicting ones may be combined with each other.

Figure 1:
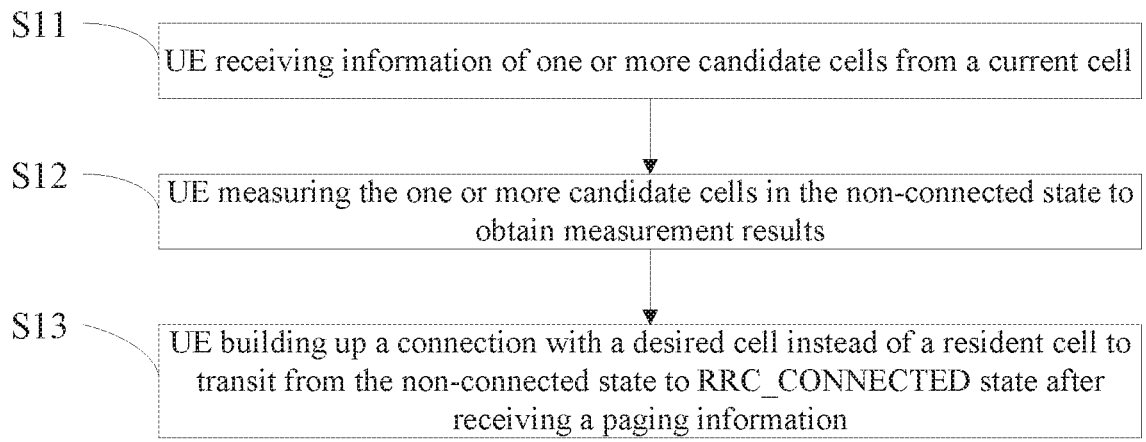
FIG. 1 is a flowchart illustrating a first embodiment of a communication state transition method according to the disclosure.

Referring to FIG. 1, a flowchart is depicted illustrating a first embodiment of a communication state transition method according to the present disclosure. The present method can be implemented on a user equipment (UE). The user equipment can be stationary or mobile, including cellular phones, personal digital assistants (PDA), wireless modems, tablet computers, notebook computers, cordless phones, etc. For purposes of illustration, the method is illustrated as being sequential. However, portions of the method may be performed in other orders or in parallel (e.g., simultaneously). The present method may include the following blocks.

At S11: the UE may receive information of one or more candidate cells from a current cell.

The UE in a non-connected state may be in RRC_IDLE or RRC_INACTIVE state. When the UE is in the non-connected state, the current cell can be the cell on which the UE currently camps, namely, the resident cell of the UE. When the UE is in RRC_CONNECTED, the current cell can be the cell to which the UE currently attaches. The UE may receive the candidate cell information when it is—already in RRC_INACTIVE or RRC_IDLE for selecting the desired cell, or receive the candidate cell information when it is in RRC_CONNECTED during state transition into RRC_INACTIVE or RRC_IDLE.

The candidate cell information, i.e., the information of the one or more candidate cells, can be delivered to the UE through at least one of system information (SI), RRC signaling, and a paging message.

The current cell can obtain the candidate cell information. Typically, the current cell and the one or more candidate cells belong to the same tracking area (TA)/notification area (NA). The concept of TA corresponds to the UE in RRC_IDLE state, and the concept of NA corresponds to the UE in RRC_INACTIVE state. The current cell may take all the other cell(s) whose information can be obtained as the candidate cell(s), and/or may select the candidate cell(s) for the UE based on certain obtained information of the UE (e.g., location, movement direction, reported measurement report of the UE).

The information of the one or more candidate cells may comprise at least one of cell identification, frequency, operating bandwidth, priority, supported service type, current traffic load, additional reference signal, and beam sweeping information of the one or more candidate cells, so that the UE can perform measurement and selection based on its own requirement. The priority of the one or more candidate cells may be configured specifically for each UE, for example, high priority may be configured to the cell of the UE previously connected to in RRC_CONNECTED so that the UE can preferentially select the cell.

At S12: the UE may measure the one or more candidate cells in the non-connected state to obtain measurement results.

The UE can measure signal quality of the one or more candidate cells in the non-connected state to obtain the measurement results, and evaluate the suitability of each candidate cell as a future connection target when transiting to RRC_CONNECTED based on the measurement results, and select the desired cell from the one or more candidate cells. The desired cell can provide the UE with at least one of the best signal quality, the required service, the best quality of service, etc.

If the evaluation criteria is not limited to the signal quality and further comprises other constraint(s), such as the ability to provide the specified service, the traffic load being no greater than a threshold, etc., the UE can select the desired cell after measuring all the candidate cells, or filter the candidate cells with the constraint(s) first so as to remove the candidate cell(s) which do not meet the constraint(s), and then measure the remaining candidate cells for selection, through such filtering, the amount of the candidate cells which the UE needs to measure and the power consumption can be reduced.

If the candidate cell information is delivered to the UE through the paging message, the UE only can measure the candidate cells for selection after receiving the paging message. If the candidate cell information is delivered to the UE through the system information and/or RRC signaling, the UE may initiate the measurement of the candidate cells after receiving the candidate cell information and/or after transiting to the non-connected state, or may measure the candidate cells after receiving the paging message.

In the non-connected state, the UE may also perform measurement for cell reselection aiming at selecting the resident cell, while the measurement in the present block is for selection of the desired cell during the UE transiting states from RRC_INACTIVE or RRC_IDLE to RRC_CONNECTED. Since the purposes of the two measurements are different, the configuration of the two measurements can be different, such as different measurement periods, reference signals, etc.

At S13: the UE may build up a connection with the desired cell instead of the resident cell to transit from the non-connected state to RRC_CONNECTED state after receiving the paging message.

The frequency of the desired cell may be the same as or different from the frequency of the resident cell. Note that the operating frequency of the UE is the same as the frequency of the resident cell (where the UE is camping). If the frequency of the desired cell is different from the frequency of the resident cell, the UE first receives the paging message from the resident cell, and then either directly change its operating frequency to the frequency of the desired cell to build up the connection with the desired cell, or change the operating frequency to the frequency of the desired cell to receive the paging message from the desired cell first and then build up the connection with the desired cell.

According to the present embodiment, the UE can build up RRC connection with the desired cell instead of the resident cell after receiving the paging message, and the desired cell can be selected by the UE in the non-connected state from the candidate cells based on the measurement results obtained by measuring the one or more candidate cells, so that for the case that the resident cell of the UE is different from its desired cell, the UE can directly build up the connection with its desired cell while transiting to RRC_CONNECTED state from RRC_INACTIVE or RRC_IDLE state, thereby eliminating the unnecessary process of UE building up a connection with the resident cell and then handover to the desired cell, so as to reduce the signaling overhead, including the RRC signaling overhead, as well as the signaling overhead during handover.

Figure 2:
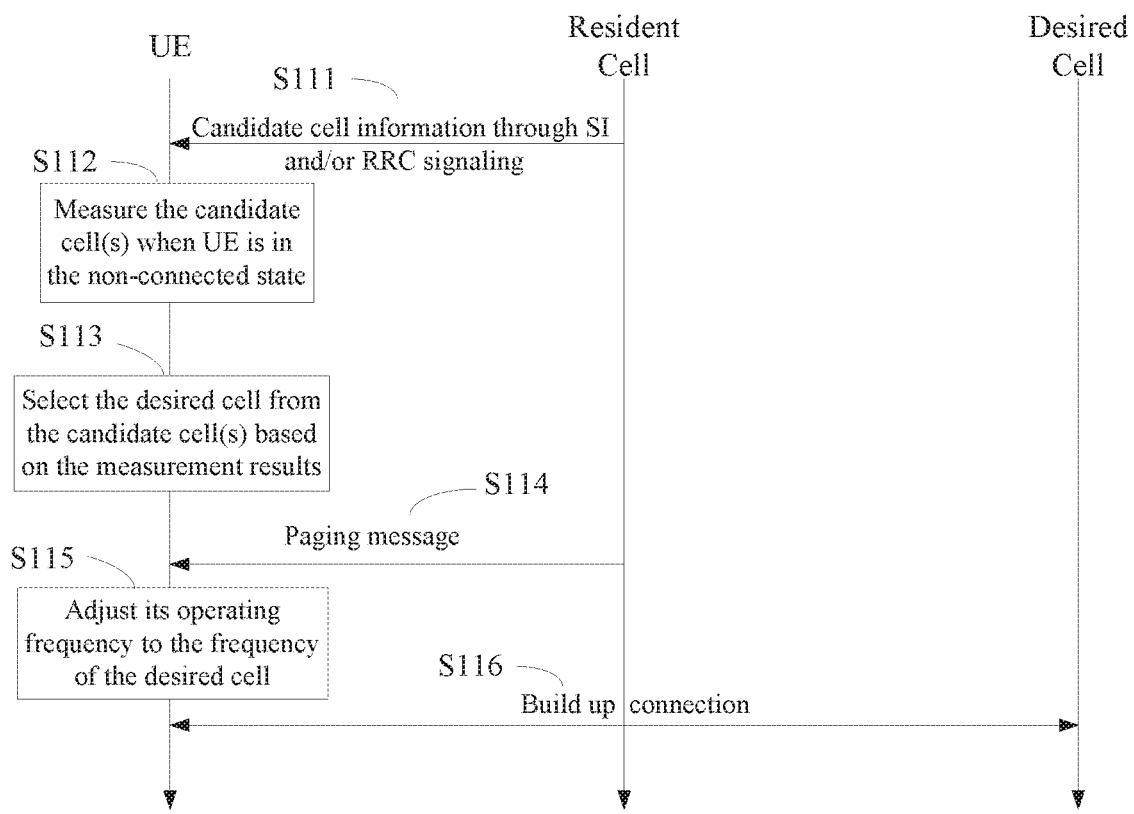
FIG. 2 is a flowchart illustrating a second embodiment of a communication state transition method according to the disclosure.

Referring to FIG. 2, a flowchart is depicted illustrating a second embodiment of a communication state transition method according to the present disclosure, which is based on the first embodiment of the communication state transition method, and in which the candidate cell information is delivered to the UE through the system information and/or RRC signaling and the UE builds up the connection directly with the desired cell after receiving the paging message from the resident cell. The present embodiment is a further extension of the first embodiment of the communication state transition method, hence common contents as those of the first embodiment will not be detailed again. The method according to the present embodiment may include the following blocks.

At S111: the UE may receive the candidate cell information from the current cell through the system information and/or RRC signaling.

The UE can receive the candidate cell information through RRC signaling when it is in RRC_CONNECTED before transiting to the non-connected state. In one embodiment according to the present disclosure, RRC signaling may be RRCConnectionRelease or RRCConnectionSuspend.

The UE may receive the candidate cell information through the system information (SI) when it is in RRC_INACTIVE, RRC_IDLE or RRC_CONNECTED state. SI may be minimum SI or other SI. The minimum SI is broadcasted periodically, and other SI may be broadcasted or be provisioned for the UE in a dedicated manner triggered by the network or upon request of the UE.

At S112: the UE may measure the one or more candidate cells in the non-connected state to obtain the measurement results.

At S113: the UE may select the desired cell from the candidate cell(s) based on the measurement results.

At S114: the UE may receive the paging message from the resident cell.

At S115: the UE may adjust its operating frequency to the frequency of the desired cell.

The present block can be omitted if the resident cell has the same frequency as the desired cell.

At S116: the UE may build up the connection with the desired cell.

Figure 3:
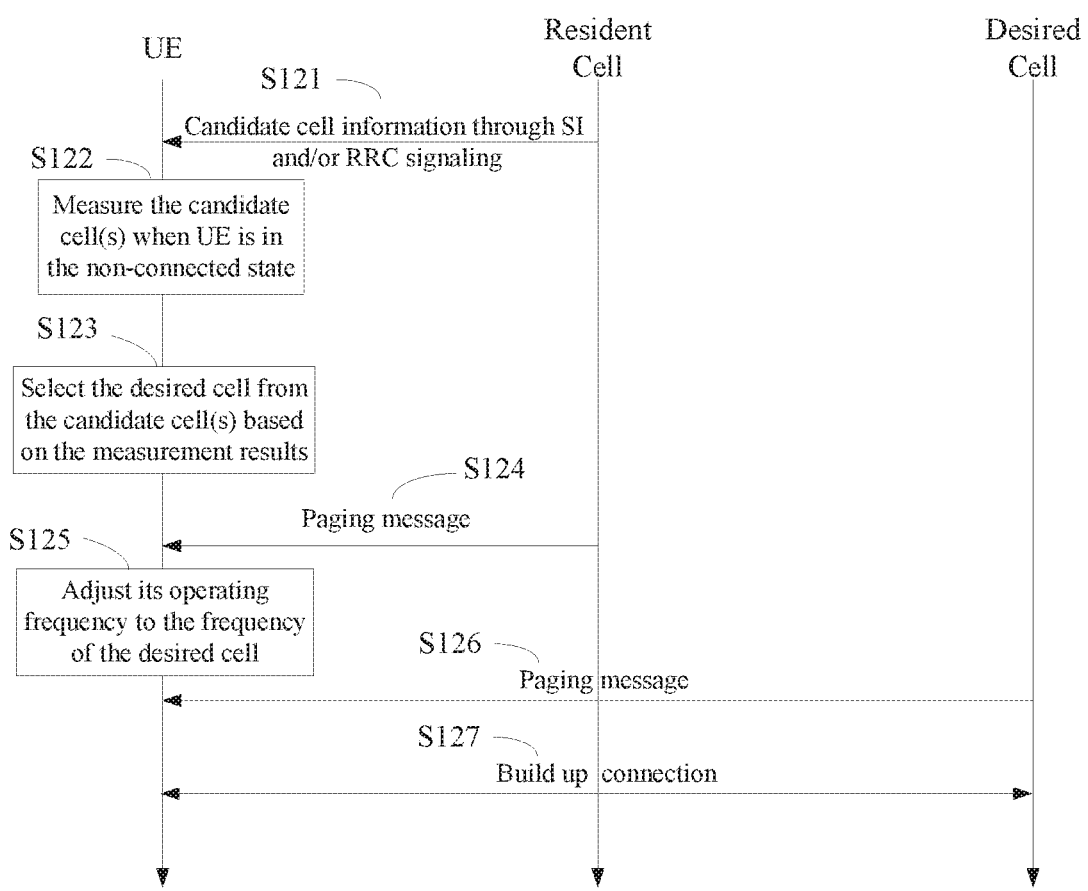
FIG. 3 is a flowchart illustrating a third embodiment of a communication state transition method according to the disclosure.

Referring to FIG. 3, a flowchart is depicted illustrating a third embodiment of a communication state transition method according to the present disclosure, which is based on the first embodiment of the communication state transition method, and in which the candidate cell information is delivered to the UE through system information and/or RRC signaling and the UE builds up the connection with the desired cell in response to the paging message from the desired cell. The difference between the present embodiment and the second embodiment of the communication state transition method according to the present disclosure is the timing of building up the connection with base station of the desired cell, and the common contents as those of the second embodiment will not be detailed again. The method according to the present embodiment may include the following blocks.

At S121: the UE may receive the candidate cell information from the current cell through the system information and/or RRC signaling.

At S122: the UE may measure the one or more candidate cells to obtain the measurement results.

At S123: the UE may select the desired cell from the candidate cells based on the measurement results.

At S124: the UE may receive the paging message from the resident cell.

At S125: the UE may adjust its operating frequency to frequency of the desired cell.

The present block can be omitted if the resident cell has the same frequency as the desired cell.

At S126: the UE may receive the paging message from the desired cell.

At S127: the UE may build up the connection with the desired cell.

Figure 4:
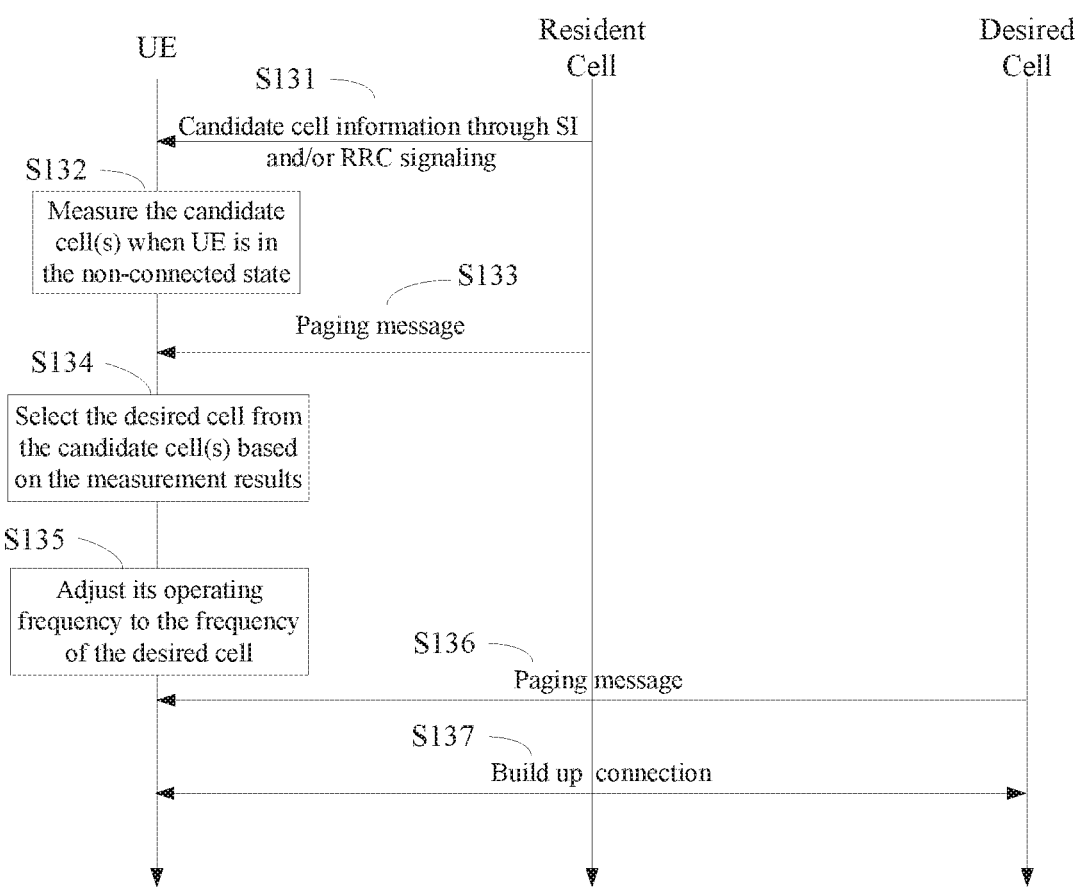
FIG. 4 is a flowchart illustrating a fourth embodiment of a communication state transition method according to the disclosure.

Referring to FIG. 4, a flowchart is depicted illustrating a fourth embodiment of a communication state transition method according to the present disclosure, which is based on the first embodiment of the communication state transition method, and in which the candidate cell information is delivered to the UE through the system information and/or RRC signaling and the UE builds up the connection with the desired cell after receiving the paging message from the desired cell. The difference between the present embodiment and the third embodiment of the communication state transition method according to the present disclosure is that the desired cell is selected after instead of before receiving the paging message from the resident cell, and the common contents as those of the second embodiment will not be detailed again. The method according to the present embodiment may include the following blocks.

At S131: the UE may receive the candidate cell information from the current cell through the system information and/or RRC signaling.

At S132: the UE may measure the one or more candidate cells in the non-connected state to obtain the measurement results.

At S133: the UE may receive the paging message from the resident cell.

At S134: the UE may select the desired cell from the candidate cells based on the measurement results.

At S135: the UE may adjust its operating frequency to the frequency of the desired cell.

The present block can be omitted if the resident cell has the same frequency as the desired cell.

At S136: the UE may receive the paging message from the desired cell.

At S137: the UE may build up the connection with the desired cell.

In other embodiments, the UE may omit block S136 and build up the connection directly with the desired cell after receiving the paging message from the resident cell.

Figure 5:
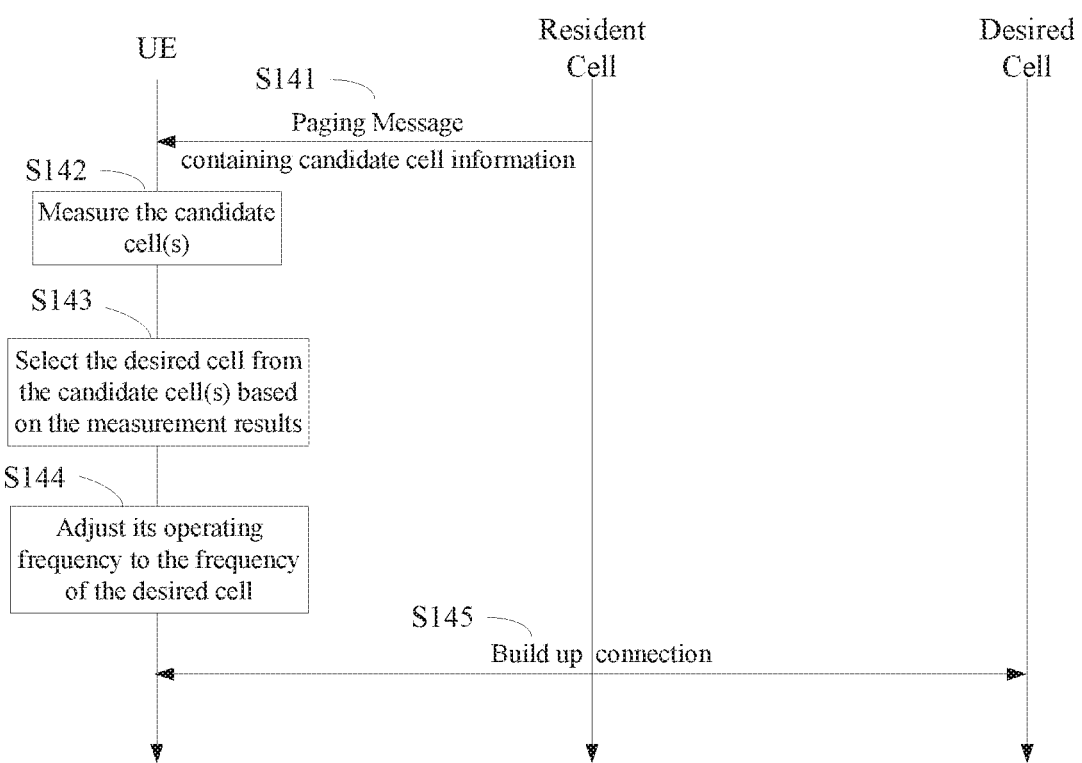
FIG. 5 is a flowchart illustrating a fifth embodiment of a communication state transition method according to the disclosure.

Referring to FIG. 5, a flowchart is depicted illustrating a fifth embodiment of a communication state transition method according to the present disclosure, which is based on the first embodiment of the communication state transition method, and in which the candidate cell information is delivered to the UE through the paging message and the UE builds up the connection directly with the desired cell after receiving the paging message from the resident cell. The difference between the present embodiment and the second embodiment of the communication state transition method according to the present disclosure is the different ways of delivering the candidate cell information to the UE, and the common contents as those of the second embodiment will not be detailed again. The method according to the present embodiment may include the following blocks.

At S141: the UE may receive the paging message from the resident cell, and the candidate cell information may be delivered to the UE through the paging message.

The UE can be in the non-connected state, and the current cell can be the resident cell.

At S142: the UE may measure the one or more candidate cells to obtain the measurement results.

At S143: the UE may select the desired cell from the candidate cells based on the measurement results.

At S144: the UE may adjust its operating frequency to the frequency of the desired cell.

The present block can be omitted if the resident cell has the same frequency as the desired cell.

At S145: the UE may build up the connection with the desired cell.

Figure 6:
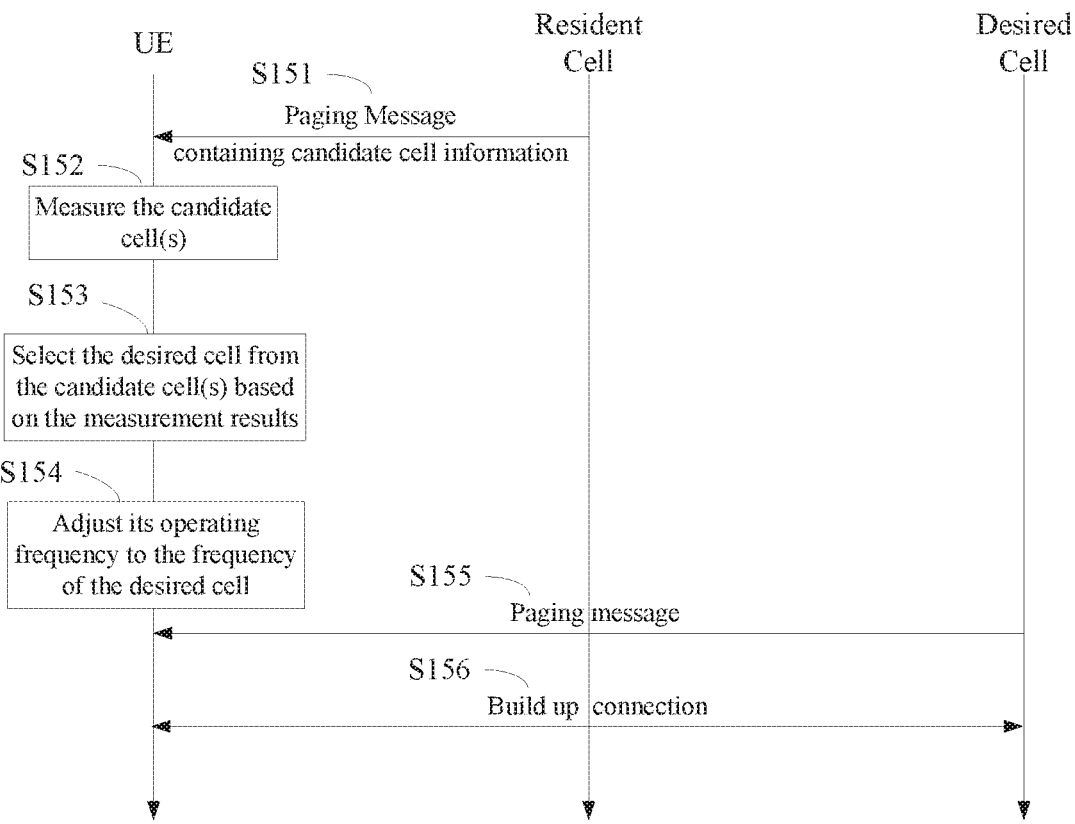
FIG. 6 is a flowchart illustrating a sixth embodiment of a communication state transition method according to the disclosure.

Referring to FIG. 6, a flowchart is depicted illustrating a sixth embodiment of a communication state transition method according to the present disclosure, which is based on the first embodiment of the communication state transition method, and in which the candidate cell information is delivered to the UE through the paging message, and the UE builds up the connection with the desired cell after receiving the paging message from the desired cell. The difference between the present embodiment and the fifth embodiment of the communication state transition method according to the present disclosure is the timing of building up the connection with base station of the desired cell, and the common contents as those of the second embodiment will not be detailed again. The method according to the present embodiment may include the following blocks.

At S151: the UE may receive the paging message from the resident cell, and the candidate cell information may be delivered to the UE through the paging message.

The UE can be in the non-connected state, and the current cell can be the resident cell.

At S152: the UE may measure the one or more candidate cells to obtain the measurement results.

At S153: the UE may select the desired cell from the candidate cells based on the measurement results.

At S154: the UE may adjust its operating frequency to the frequency of the desired cell.

The present block can be omitted if the resident cell has the same frequency as the desired cell.

At S155: the UE may receive the paging message from the desired cell.

At S156: the UE may build up the connection with the desired cell.

Figure 7:
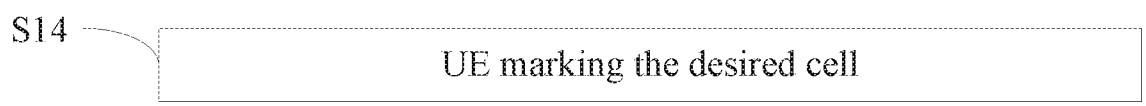
FIG. 7 is a flowchart illustrating a seventh embodiment of a communication state transition method according to the disclosure.

Referring to FIG. 7, a flowchart is depicted illustrating a seventh embodiment of a communication state transition method according to the present disclosure, which is based on any one of the first to sixth embodiments of the communication state transition method and possible combinations of embodiments according to the present disclosure and further comprising the following block after the UE selecting the desired cell from the candidate cells based on the measurement results.

At S14: the UE may mark the desired cell.

The UE may mark the desired cell for the subsequent connection building up processes by adding a label to the desired cell or deleting the information of the other unselected candidate cell(s), or by storing information of the desired cell independently.

Figure 8:
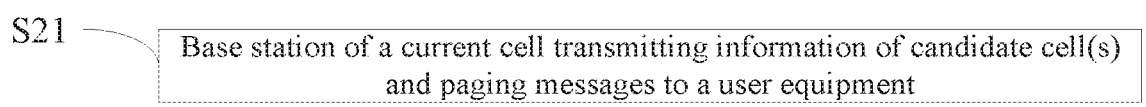
FIG. 8 is a flowchart illustrating an eight embodiment of a communication state transition method according to the disclosure.

Referring to FIG. 8, a flowchart is depicted illustrating a first embodiment of a communication state transition method according to the present disclosure. The present method can be implemented on a base station. The base station can be connected to a core network and can perform wireless communication with UE to provide communication coverage for the corresponding geographical area. The base station may be a macro base station, a micro base station, a pico base station, or a femtocell. In some embodiments, the base station may also be referred to as a radio base station, an access point, a node B, an evolved node B (eNodeB, eNB), a gNB, or other suitable terminology. For purposes of illustration, the method is illustrated as being sequential. However, portions of the method may be performed in other orders or in parallel (e.g., simultaneously). The present method may include the following blocks.

At S21: a base station of a current cell may transmit information of candidate cell(s) and paging messages to a UE.

When the UE is in a RRC_INACTIVE or RRC_IDLE state, the current cell can be the resident cell of the UE. When the UE is in RRC_CONNECTED, the current cell can be the cell to which the UE currently attaches.

The candidate cell information can be delivered to the UE through at least one of the system information (SI), RRC signaling, and the paging messages. RRC signaling may be RRCConnectionRelease or RRCConnectionSuspend.

The base station of the current cell can obtain information of the one or more candidate cells. The base station of the current cell may be the same as or different from the base station of the candidate cell(s). Typically, the current cell and the one or more candidate cells belong to the same TA/NA. The concept of TA corresponds to the UE in RRC_IDLE state, and the concept of NA corresponds to the UE in RRC_INACTIVE state. The base station of current cell may take all other cell(s) whose information can be obtained as the candidate cell(s), or may select the candidate cell(s) for the UE based on certain obtained information of the UE (e.g., location, movement direction, reported measurement report of the UE).

The information of the one or more candidate cells may comprise at least one of cell identification, frequency, operating bandwidth, priority, supported service type, current traffic load, additional reference signal, and beam sweeping information of the one or more candidate cells, so that the UE can perform measurement and selection based on its own requirement. The priority of the candidate cell(s) may be configured specifically for each UE, for example, high priority may be configured to the cell of the UE previously connected to in RRC_CONNECTED so that the UE can preferentially select the cell.

The UE can build up the connection with the desired cell instead of the resident cell to transit from the non-connected state to RRC_CONNECTED state after receiving the paging messages, wherein the desired cell can be selected by the UE in the non-connected state from the one or more candidate cells based on the measurement results obtained by measuring the one or more candidate cells.

According to the present embodiment, the UE can build up RRC connection with the desired cell instead of the resident cell after receiving the paging message, and the desired cell can be selected by the UE in the non-connected state from the candidate cells based on the measurement results obtained by measuring the one or more candidate cells, so that for the case that the resident cell of the UE is different from its desired cell, the UE can directly build up the connection with its desired cell when transiting to RRC_CONNECTED from RRC_INACTIVE or RRC_IDLE state, thereby avoiding the process of UE building up a connection with the resident cell and then handover to the desired cell, so as to reduce the signaling overhead, including the RRC signaling overhead, as well as the signaling overhead during handover.

Figure 9:
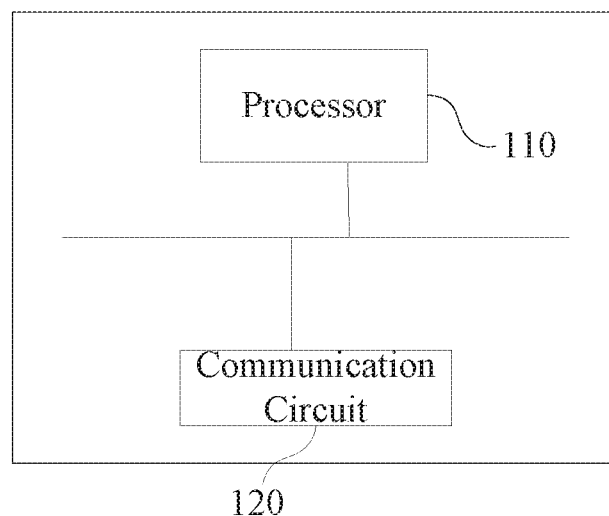
FIG. 9 is a block diagram illustrating a first embodiment of a communication state transition apparatus according to the disclosure.

Referring to FIG. 9, a block diagram is depicted illustrating a first embodiment of a communication state transition apparatus according to the present disclosure. The communication state transition apparatus may comprise a processor 110 and a communication circuit 120 coupled to the processor 110.

The communication circuit 120 can be configured to transmit and receive data, and serve as an interface for the communication state transition apparatus to communicate with other communication apparatuses.

The processor 110 can control the operation of the communication state transition apparatus, which may also be referred to as a central processing unit (CPU). The processor 110 may be an integrated circuit chip with signal processing capability, or a general purpose processor, a digital signal processor (DSP), an application specific integrated circuit (ASIC), a field programmable gate array (FPGA) or other programmable logic device, a discrete gate or transistor logic apparatus, a discrete hardware component. The general purpose processor may be a microprocessor or any conventional processor.

The processor 110 can be configured to execute instructions to implement the method proposed by any one of the first to seventh embodiments and non-collision combinations of embodiments of the communication state transition method according to the present disclosure.

The communication state transition apparatus in the present embodiment may be a UE or a stand-alone component which can be integrated in the UE such as a baseband chip.

Figure 10:
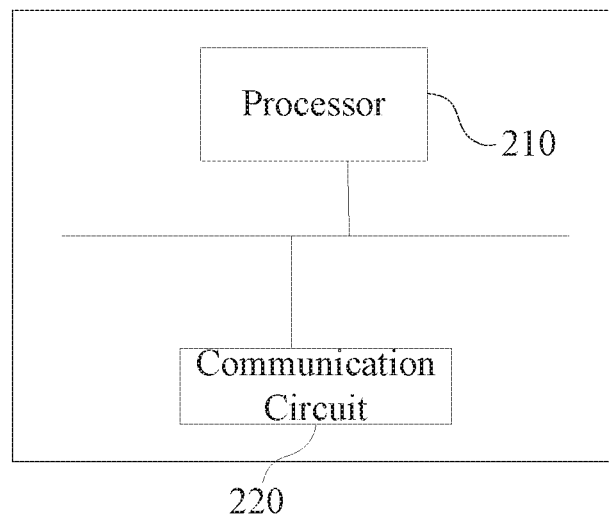
FIG. 10 is a block diagram illustrating a second embodiment of a communication state transition apparatus according to the disclosure.

Referring to FIG. 10, a block diagram is depicted illustrating a second embodiment of a communication state transition apparatus according to the present disclosure. The communication state transition apparatus may comprise a processor 210 and a communication circuit 220 coupled to the processor 110.

The communication circuit 220 can be configured to transmit and receive data, and serve as an interface for the communication state transition apparatus to communicate with other communication apparatuses.

The processor 510 can control the operation of the communication state transition apparatus, which may also be referred to as a central processing unit (CPU). The processor 210 may be an integrated circuit chip with signal processing capability, or a general purpose processor, a digital signal processor (DSP), an application specific integrated circuit (ASIC), a field programmable gate array (FPGA) or other programmable logic device, a discrete gate or transistor logic apparatus, a discrete hardware component. The general purpose processor may be a microprocessor or any conventional processor.

The processor 210 can be configured to execute instructions to implement the method proposed by the eighth embodiment of the communication state transition method according to the present disclosure.

The communication state transition apparatus in the present embodiment may be a base station or a stand-alone component which can be integrated in the base station such as a baseband board.

Figure 11:
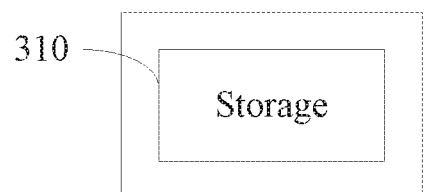
FIG. 11 is a block diagram illustrating a third embodiment of a communication state transition apparatus according to the disclosure.

Referring to FIG. 11, a block diagram is depicted illustrating a third embodiment of a communication state transition apparatus according to the present disclosure. The communication state transition apparatus may comprise a storage 310. The storage 310 can store instructions which can implement the method proposed by any one of the first to seventh embodiments and non-collision combinations of embodiments of the communication state transition method according to the present disclosure while executed.

The storage 310 may comprise a read-only memory (ROM), a random access memory (RAM), a flash memory, a hard disk, an optical disk, etc.

The communication state transition apparatus in the present embodiment may be a UE or a stand-alone component which can be integrated in the UE such as a baseband chip.

Figure 12:
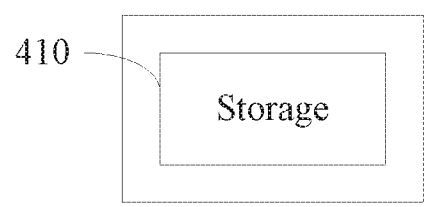
FIG. 12 is a block diagram illustrating a fourth embodiment of a communication state transition apparatus according to the disclosure.

Referring to FIG. 12, a block diagram is depicted illustrating a fourth embodiment of a communication state transition apparatus according to the present disclosure. The communication state transition apparatus may comprise a storage 410. The storage 410 can store instructions which can implement the method proposed by the eighth embodiment of the communication state transition method according to the present disclosure while executed.

The storage 410 may comprise a read-only memory (ROM), a random access memory (RAM), a flash memory, a hard disk, an optical disk, etc.

The communication state transition apparatus in the present embodiment may be a base station or a stand-alone component which can be integrated in the base station such as a baseband board.

Figure 13:
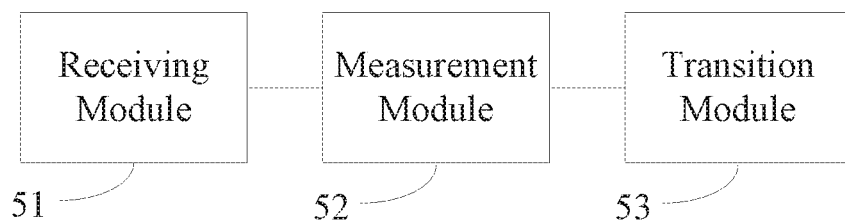
FIG. 13 is a block diagram illustrating a fifth embodiment of a communication state transition apparatus according to the disclosure.

Referring to FIG. 13, a block diagram is depicted illustrating a fifth embodiment of a communication state transition apparatus according to the present disclosure. The communication state transition apparatus may comprise:

a receiving module 51 configured to receive the information of the candidate cell(s) from the current cell;

a measurement module 52 configured to measure the candidate cell(s) in the non-connected state to obtain measurement results; and a transition module 53 configured to build up the connection with the desired cell instead of the resident cell to transit from the non-connected state to a RRC_CONNECTED state after receiving the paging message, where the desired cell is selected by the UE from the candidate cell(s) based on the measurement results.

The communication state transition apparatus in the present embodiment may be a UE or a stand-alone component which can be integrated in the UE such as a baseband chip.

Figure 14:
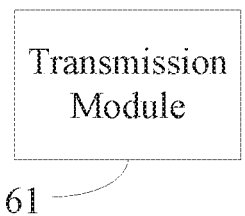
FIG. 14 is a block diagram illustrating a sixth embodiment of a communication state transition apparatus according to the disclosure.

Referring to FIG. 14, a block diagram is depicted illustrating a sixth embodiment of a communication state transition apparatus according to the present disclosure. The communication state transition apparatus may comprise:

a transmission module 61 configured to transmit the candidate cell information and the paging message to the UE, so that the UE can build up the connection with its desired cell instead of instead of the resident cell to transit from a RRC_INACTIVE or RRC_IDLE state to RRC_CONNECTED state after receiving the paging message, where the desired cell is selected by the UE from the candidate cell(s) based on the measurement results obtained by measuring the candidate cell(s) in the non-connected state.

The communication state transition apparatus in the present embodiment may be a base station or a stand-alone component which can be integrated in the base station such as a baseband board.

The function of each part and the feasible extension of each embodiment of the communication state transition apparatus according to the present disclosure can refer to the description in the corresponding embodiments of the communication state transition method according to the present disclosure, and will not be detailed again.

It can be appreciated that the apparatuses and methods disclosed herein can also be implemented in other forms. Rather, the apparatuses as described are merely illustrative. For example, the division of modules or units is performed solely based on logic functions, thus in actual implementations there may be other division methods, e.g., multiple units or components may be combined or integrated onto another system, or some features may be ignored or simply not executed. In addition, mutual couplings, direct couplings, or communications connections as displayed or discussed may be achieved through some interfaces, devices, or units, and may be achieved electrically, mechanically, or in other forms.

Separated units as described may or may not be physically separated. Components displayed as units may or may not be physical units, and may reside at one location or may be distributed to multiple networked units. Part or all of the units may be selectively adopted according to actual requirements to achieve objectives of the disclosure.

Additionally, various functional units described herein may be integrated into one processing unit or may be present as a number of physically separated units, and two or more units may be integrated into one. The integrated units may be implemented by hardware or as software functional units.

If the integrated units are implemented as software functional units and sold or used as standalone products, they may be stored in a computer readable storage medium. On the basis of such an understanding, the essential technical solution or all or part of the technical solution of the disclosure may be embodied as software products. Computer software products can be stored in a storage medium and can include multiple instructions enabling a computing device (e.g., a personal computer, a server, a network device, etc.) or a processor to execute all or part of the methods as described in the disclosure. The storage medium may include all kinds of media that can store program codes, such as a USB flash disk, mobile hard drive, read-only memory (ROM), random access memory (RAM), magnetic disk, or optical disk.

The above description merely illustrates some exemplary embodiments of the disclosure, which however are not intended to limit the scope of the disclosure to these specific embodiments. Any equivalent structural or flow modifications or transformations made to the disclosure, or any direct or indirect applications of the disclosure on any other related fields, shall all fall in the scope of the disclosure.

What is claimed is:

1. A communication state transition method, comprising:
receiving, by a user equipment, information of one or more candidate cells and a paging message from a current cell, wherein the information of the one or more candidate cells is delivered to the user equipment through the paging message;
measuring, by the user equipment, the one or more candidate cells when the user equipment is in a RRC_INACTIVE or RRC_IDLE state to obtain measurement results;
selecting, by the user equipment, the desired cell from the one or more candidate cells based on the measurement results;
building up, by the user equipment, a connection with a desired cell instead of the current cell to transit from the RRC_INACTIVE or RRC_IDLE state to RRC_CONNECTED state after receiving the paging message; and
performing a handover to the desired cell.

2. The method according to claim 1, wherein the building up the connection with the desired cell instead of the current cell after receiving the paging message comprises:
receiving, by the user equipment, the paging message from the current cell; and
building up, by the user equipment, the connection with the desired cell instead of the current cell.

3. The method according to claim 1, wherein the building up the connection with the desired cell instead of the current cell after receiving the paging message comprises:
receiving, by the user equipment, the paging message from the current cell;
receiving, by the user equipment, the paging message from the desired cell; and
building up, by the user equipment, the connection with the desired cell instead of the current cell.

4. The method according to claim 1, wherein the information of the one or more candidate cells comprises at least one of cell identification, frequency, operating bandwidth, priority, supported service type, current traffic load, additional reference signal, and beam sweeping information of the one or more candidate cells.

5. The method according to claim 1, wherein the one or more candidate cells and the current cell belong to the same Tracking Area (TA)/Notification Area (NA).

6. A communication state transition method, comprising:
transmitting, by a base station of a current cell, information of one or more candidate cells and paging messages to a user equipment, so that the user equipment builds up a connection with a desired cell instead of the current cell to transit from a RRC_INACTIVE or RRC_IDLE state to a RRC_CONNECTED state after receiving the paging messages, and the user equipment performs a handover to the desired cell, wherein the desired cell is selected by the user equipment from the one or more candidate cells based on measurement results obtained by measuring the one or more candidate cells when the use equipment is in the RRC_INACTIVE or RRC_IDLE state, and wherein the information of the one or more candidate cells is delivered to the user equipment through the paging message.

7. The method according to claim 6, wherein the information of one or more candidate cells is delivered to the user equipment through at least one of system information, RRC signaling, and the paging messages.

8. The method according to claim 7, wherein RRC signaling is RRCConnectionRelease or RRCConnectionSuspend.

9. The method according to claim 6, wherein the information of the one or more candidate cells comprises at least one of cell identification, frequency, operating bandwidth, priority, supported service type, current traffic load, additional reference signal, and beam sweeping information of the one or more candidate cells.

10. The method according to claim 6, wherein the one or more candidate cells and the resident cell belong to the same Tracking Area (TA)/Notification Area (NA).

11. A communication state transition apparatus comprising a processor and a communication circuit coupled to the processor, wherein the processor is configured to execute instructions to implement operations of:
receiving information of one or more candidate cells and a paging message from a current cell, wherein the information of the one or more candidate cells is delivered to the user equipment through the paging message;
measuring the one or more candidate cells when the user equipment is in a RRC_INACTIVE or RRC_IDLE state to obtain measurement results;
selecting, by the user equipment, the desired cell from the one or more candidate cells based on the measurement results;
building up a connection with a desired cell instead of the resident cell to transit from the RRC_INACTIVE or RRC_IDLE state to RRC_CONNECTED state after receiving the paging message; and
performing a handover to the desired cell.

12. A communication state transition apparatus storied with instructions, wherein the instructions are executed to implement operations of:
receiving information of one or more candidate cells and a paging message from a current cell, wherein the information of the one or more candidate cells is delivered to the user equipment through the paging message;
measuring the one or more candidate cells when the user equipment is in a RRC_INACTIVE or RRC_IDLE state to obtain measurement results;
selecting, by the user equipment, the desired cell from the one or more candidate cells based on the measurement results;
building up, by the user equipment, a connection with a desired cell instead of the current cell to transit from the RRC_INACTIVE or RRC_IDLE state to RRC_CONNECTED state after receiving the paging message; and
performing a handover to the desired cell.

13. A communication state transition apparatus, comprising:
a receiving module configured to receive information of one or more candidate cells and a paging message from a current cell, wherein the information of the one or more candidate cells is delivered to the communication state transition apparatus through the paging message;

a measurement module configured to measure the one or more candidate cells in a RRC_INACTIVE or RRC_IDLE state to obtain measurement results; and a transition module configured to build up a connection with a desired cell instead of a resident cell to transit from the RRC_INACTIVE or RRC_IDLE state to a RRC_CONNECTED state after receiving a paging message, wherein the desired cell is selected by the user equipment from the one or more candidate cells based on the measurement results and the communication state transition apparatus performs a handover to the desired cell.

14. A communication state transition apparatus, comprising:

a transmission module configured to transmit information of one or more candidate cells and a paging message to a user equipment, so that the user equipment builds up a connection with a desired cell instead of a current cell to transit from a RRC_INACTIVE or RRC_IDLE state to a RRC_CONNECTED state after receiving the paging message, and the user equipment performs a handover to the desired cell, wherein the desired cell is selected by the user equipment from the one or more candidate cells based on measurement results obtained by measuring the one or more candidate cells when the user equipment is in the RRC_INACTIVE or RRC_IDLE state, and wherein the information of the one or more candidate cells is delivered to the user equipment through the paging message.

* * * * *